Jan. 3, 1967  R. E. CHILDERS  3,295,532
PRODUCE CUTTING MACHINE
Original Filed July 12, 1963  6 Sheets-Sheet 1

INVENTOR
ROSS E. CHILDERS
BY Hans G. Hoffmeister
ATTORNEY

Jan. 3, 1967    R. E. CHILDERS    3,295,532
PRODUCE CUTTING MACHINE

Original Filed July 12, 1963    6 Sheets-Sheet 4

INVENTOR
ROSS E. CHILDERS

BY *Hans G. Hoffmeister*
ATTORNEY

Jan. 3, 1967   R. E. CHILDERS   3,295,532
PRODUCE CUTTING MACHINE
Original Filed July 12, 1963   6 Sheets-Sheet 5

INVENTOR
ROSS E. CHILDERS
BY Hans G. Hoffmeister
ATTORNEY

3,295,532
PRODUCE CUTTING MACHINE
Ross E. Childers, Hoopeston, Ill., assignor to FMC Corporation, San Jose, Calif., a corporation of Delaware
Continuation of application Ser. No. 294,537, July 12, 1963. This application May 17, 1965, Ser. No. 458,831
13 Claims. (Cl. 130—9)

This application is a continuation of my pending application Serial No. 294,537, filed July 12, 1963, now abandoned.

This invention relates to produce cutting machines that are operative to cut the outer appendages from an inner core such as kernels from green corn, and more particularly concerns an improved apparatus for controlling the blades of such machines.

This invention is an improvement over the corn cutting machines disclosed in U.S. Patents, 2,323,092, 2,577,530, and 2,787,273, issued June 29, 1943, December 4, 1951, and April 2, 1957, respectively, to Charles E. Kerr, which are assigned to the same assignee as this invention.

The corn cutting machine, disclosed in the referenced patents, includes a rotating cutter supporting head that pivotally supports kernel removing cutters in such a manner that a variable sized circular opening is formed through which an ear of corn passes to effect removal of the kernels. A gauging mechanism, having gauging fingers at the entrance of the circular opening engaging diametrically opposed peripheral portions of the ear, is provided for adjusting the circular opening so that a line of cut, a predetermined distance above the cob-line is formed. Ideally, the cutters should define a line of cut extending an equal distance above the cob-line of each ear. The structure of the referenced patents have been largely successful in achieving this result by providing a weighted portion to each blade which imposed a centrifugal force urging the blade to maintain the adjusted position determined by the gauging mechanism. The force urging each blade to its adjusted position is constant for a constant rate of rotation of the rotating cutter supporting head. A spring assembled to impose a constant value of force is provided to continuously urge the knives toward the direction of minimum opening and thus acts in the same direction as the weighted portion of the blades.

One concept of this invention pertains to a structure that is operable during operation of the machine for selectively increasing or decreasing the force with which the cutters are urged in the position determined by the gauging mechanism. This provides for immediate observation of the result of an adjustment and its correction. The cutting characteristics of variable density sweet corn can be quickly and easily ascertained and compensated for. The condition of the cutters (shape, sharpness, etc.) is ascertainable by observing the cutting action and compensation can be introduced while the machine remains in operation.

Accordingly, it is an object of this invention to provide a produce cutting machine having the cutting knife thereof resiliently maintained in a desired nominal position, which nominal position can be adjusted while the machine is in operation.

Another object of this invention is to accomplish the above by varying the force with which the cutting elements of a produce cutting machine are retained in the desired nominal cutting position.

The manner in which these and other objects of the invention may be obtained will be apparent from the following detailed description of the preferred apparatus for carrying out the invention.

The construction and operation of the machine as a whole are fully illustrated and described in the referenced patents, particularly Patent No. 2,787,273, therefore it will suffice for the purposes of the present disclosure to describe the features common to both with only that degree of particularity which is essential to a full understanding of the present invention. It will be understood, of course, that said patent is incorporated by reference in the present specification and may be referred to for details of construction and operation not disclosed herein.

Figure 1:
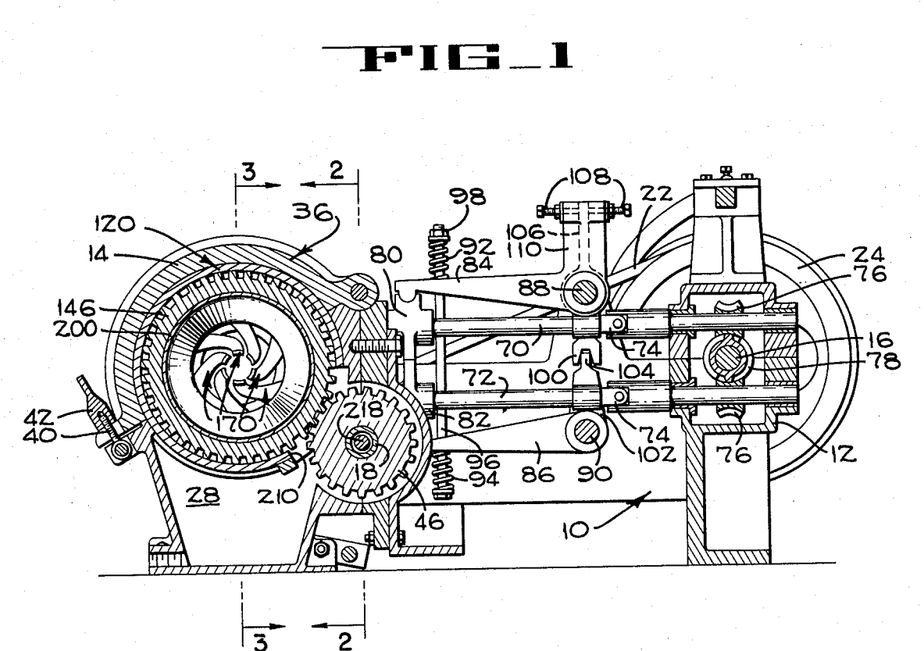
FIGURE 1 is a schematic transverse section through a corn cutting machine embodying the principles of the present invention.

Referring first to FIG. 1 of the drawings, the corn cutting machine or apparatus comprises a frame 10 having a gear casing 12 at one side thereof and a housing 14 at its other side. A main drive shaft 16 is rotatably mounted in position extending longitudinally within the gear casing 12, and is driven from any suitable power source (not shown). An auxiliary drive shaft 18 (FIGS. 1, 2, 6 and 7) which is of tubular form is journaled in bearings 20 (FIG. 2) supported from the frame 10. The auxiliary shaft 18 is driven by a belt 22 (FIGS. 1, 2, 3 and 7) trained around a driving pulley 24 on the main shaft 16 and around a driven pulley 26 (FIGS. 2, 3, and 7) on the auxiliary shaft 18 adjacent one end thereof.

Figure 2:
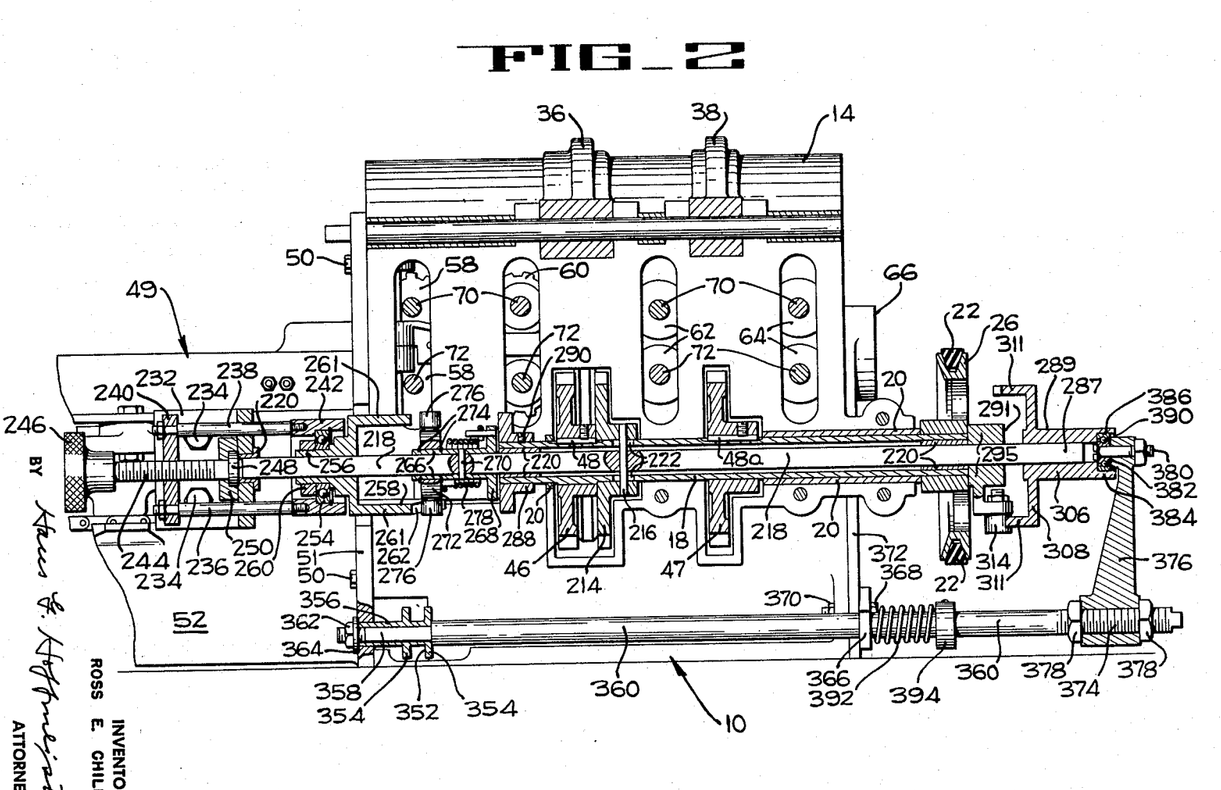
FIGURE 2 is an enlarged section along lines 2—2 of FIG. 1.
Figures 7, 8:
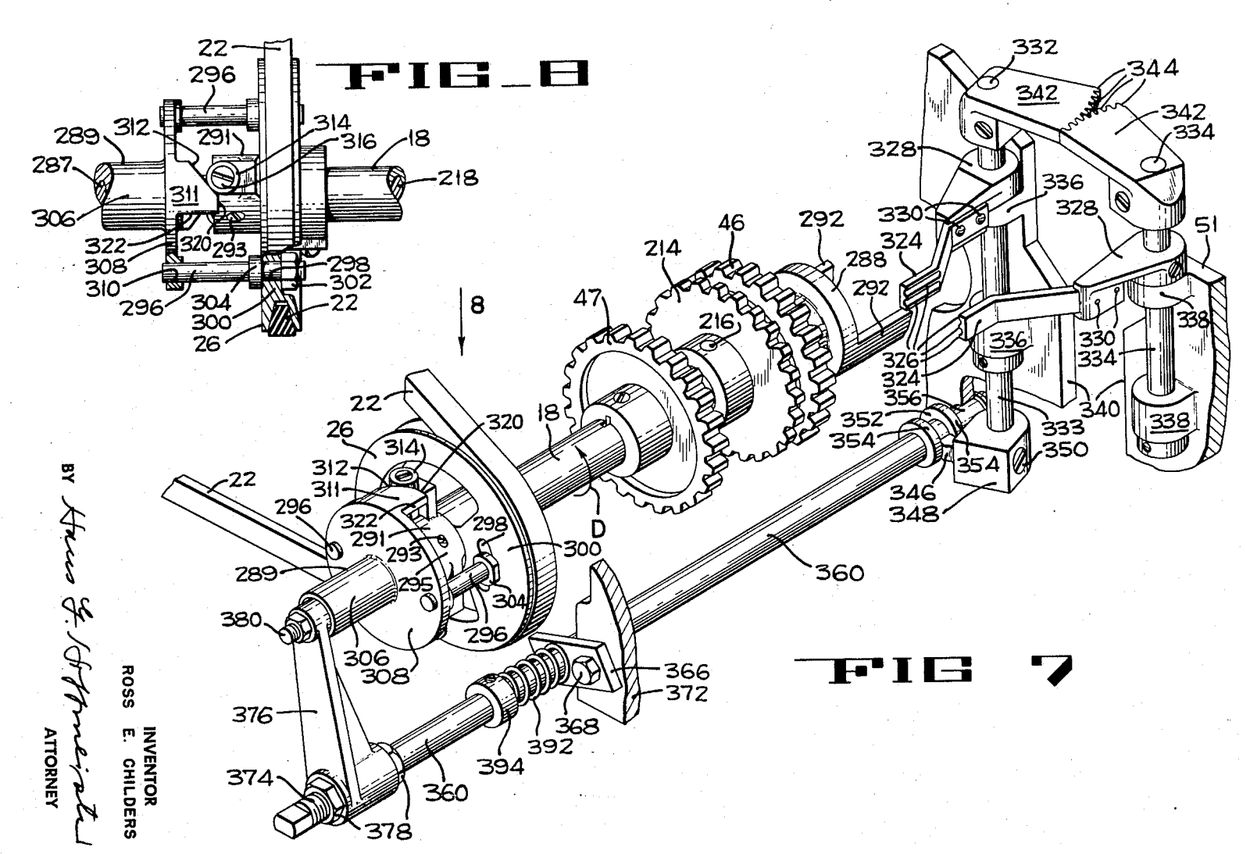
FIGURE 7 is a perspective of the mechanism for driving the cutting head and the mechanism for gauging the diameter of the produce and correspondingly adjusting the knives.
FIGURE 8 is a detail, partly broken away, viewed as indicated by arrow 8 of FIG. 7.

The bottom of the housing 14 is provided with discharge openings 15 and 15a (FIG. 3) to permit the gravitational discharge of kernels of corn removed from the ears. Two spaced partitions 28 and 30 (FIGS. 1 and 3) extend transversely of the housing 14 and support a rotary cutting head 32 and a rotary scraping head 34, respectively. The heads 32 and 34 are releasably secured in operative position by semi-circular clamps 36 and 38, respectively each of which is normally held closed by a toggle bolt 40 and wing nut 42 (FIG. 1). The rotary heads 32 and 34 are driven by gears 46 and 47, respectively, which are secured to the auxiliary shaft 18 by keys 48 and 48a (FIG 2). The direction of rotation of the heads 32 and 34 is clockwise when viewed from the discharge end of the machine, as indicated by the arrow R (FIG. 4), while the direction of rotation of the auxiliary drive shaft 18 is counterclockwise, as indicated by the arrows D (FIGS. 4 and 7).

A feed trough 49 (FIGS. 2 and 3) is secured to the front portion of the housing 14 by bolts 50 extending through a transverse web 51 of the frame 52 of the feed trough 49 into threaded engagement with the housing 14. An endless feed chain 53 within the feed trough 49 is trained around suitably mounted sprockets 54, only one of which is shown, and one of which is keyed to a drive shaft 56 operably connected to a conventional drive mechanism (not shown). The produce to be processed such as, for example husked ears of corn, are deposited end-to-end in the feed trough 49 and are advanced therealong by the feed chain 53 with their axis substantially in coincidence with the axis of rotation of the cutter and scraping heads 32 and 34. A pair of feed rollers 58 (FIG. 3) receives each ear of corn and feeds it into a second pair of feed rollers 60, the two pairs 58 and 60 of feed rollers being disposed to align, or to preserve the alignment of, the axis of the ear with that of the rotary heads 32 and 34 as the rollers 58 and 60 cooperate with each other in feeding the ear into the cutter head 32.

The feed rollers 58 and 60 are similar in construction and are spool-shaped so that they center an ear of corn passing between them. Traction with the ear is gained by making the rollers of rubber, and by cross-grooving the corn-engaging surfaces of the rollers 58 and 60.

As an ear of corn leaves the cutter head 32, the ear passes between a third pair of feed rollers 62 that advance each ear of corn to and through the scraping head 34 and to a fourth pair of feed rollers 64 by which the scraped cob is discharged from the machine through an outlet 66 whence the cob drops onto any suitable means for disposing of same, such as a discharge chute (not shown). The feed rollers 62 and 64 may be constructed of metal and preferably are provided with prongs or teeth 68 which penetrate the cobs and aid the feeding thereof.

The upper and lower feed rollers 58, 60, 62 and 64 of each pair are secured to upper and lower shafts 70 and 72 respectively, there being one such pair of shafts individual to each pair of rollers. Each shaft 70 and 72 is connected through a universal joint 74 (FIG. 1) to a worm gear 76 which is enmeshed with a driving worm 78 rigid with the main drive shaft 16. One such driving worm is provided for each pair of shafts 70, 72, the worm gears 76 of which engage the driving worm at opposite sides, so that the two shafts 70, 72 of each pair rotate in opposite directions. Hence, the feed rollers 58, 60, 62 and 64 cooperate with each other to advance the ears of corn successively from the feed trough 49, through the rotary heads 32 and 34, and through the outlet 66.

Each of the four pairs of feed rollers 58, 60, 62 and 64 is provided with means for resiliently pressing the prospectively associated upper and lower rollers toward each other. Each pair of rollers is likewise provided with means interconnecting the associated upper and lower rollers for equalized, opposite movement. Since these means employed for each pair of rollers is identical with those employed for each of the other pairs, a description of the pressing means and the equalizing means for one pair of rollers will suffice. For example, the shafts 70 and 72 of the second pair of feed rollers 60 are rotatable in upper and lower bearing blocks 80 and 82, respectively (FIG. 1), which are guided in and restricted to vertical sliding movement. Upper and lower equalizing arms 84 and 86 are pivoted, respectively, on shafts 88 and 90 which are rigidly mounted on the frame 10. The outer ends of the arms 84 and 86 bear against the bearing blocks 80 and 82 so as to press the blocks toward each other by force derived from springs 92 and 94 which encircle a tension rod 96 and each of which is under compression between one of the equalizing arms and a nut 98 on the associated end portion of the rod 96. Accordingly, the springs 92 and 94 continuously urge the feed rollers 60 toward each other to effect engagement of the same with an ear of corn with adequate pressure to ensure advance of the ear in response to rotation of the rollers.

The mechanism that interconnects the feed rollers 60 for equalized movement in opposite directions (FIG. 1) includes arms 100 and 102 extending toward each other from the upper and lower shafts 88 and 90, respectively. These two arms 100 and 102 are interengaged by a tooth and notch arrangement 104 whereby rotary motion of the one about the axis of its supporting shaft effects simultaneous and corresponding rotary motion of the other about the axis of its supporting shaft. Whereas the lower arm 102 is integral with the lower equalizing arm 86, the upper arm 100 is pivotally mounted on the shaft 88 independently of the upper equalizing arm, but is adjustably connected thereto by a lever 106 integral with the arm 100 and extending upward from the shaft where it is engaged between opposed adjusting screws 108 carried by an upwardly extending lever 110 integral with the upper equalizing arm 84. By manipulation of the adjusting screws 108, the angular position of the upper equalizing arm 84 relative to the lever 106 can be adjusted, and consequently the two feed rollers can be adjusted to positions wherein they are equi-distant from the horizontal axis of rotation of the heads 32 and 34.

In view of the fact that all the upper feed rollers 58, 60, 62 and 64 are rotated in one direction while all of the lower feed rollers are rotated in the opposite direction, an ear of corn delivered to the first pair of rollers 58 will be advanced thereby to the second pair 60, which will pass the ear through the cutter head 32 to the third pair of rollers 62, and these will, in turn, pass the ear through the scraping head 34 to the last pair of rollers 64, which discharge the scraped cob through the outlet 66.

Since the equalizer arms 84 and 86 associated with each pair of feed rollers are interconnected as above described, the rollers of each pair will be thrust apart by each ear of corn as the ear enters between the two opposed rollers, with the amount of resulting movement depending upon the diameter of the ear. Furthermore, the opposite rollers of each pair will always be disposed at equal distances above and below the axis of rotation of the heads 32 and 34, so that each ear of corn during its travel through the machine is maintained in coaxial alignment with the heads 32 and 34, thus assuring cutting and scraping of the ear to the same depth, throughout the entire circumferential extent of the same.

As mentioned previously herein, the mounting of the rotary heads 32 and 34 on the partitions 28 and 30, respectively, is such that either or both heads 32, 34 is readily demountable. Toward this end, each head 32, 34 includes an annular bearing member 120, 122, respectively (FIGS. 3 and 4) the outer circumferential surface of which is so fitted to the associated partition 28 or 30 and clamp 36 or 38 that when the head is in position on its supporting partition and the associated clamp is tightened the bearing member is immobilized within the machine. An annular bead 124 on each bearing member 120, 122 seats within a groove 125 (FIG. 3) in the inner surface of the clamp 36, 38 and thereby aids in securing the head 32, 34 against axial displacement; and the head of a screw (not shown) threaded into the housing 14 is engaged within a complementary socket in the rim 130 (FIG. 3) of each bearing member to secure the same against rotational movement about its own axis.

The mechanism 134 of the scraping head 34, which includes scraping knives 136 (FIG. 3), is driven by the gear 47 which, as hereinbefore mentioned, is secured to the auxiliary drive shaft 18. However, inasmuch as the scraping head 34 is constructed the same, and operates in the same manner, as the scraping head illustrated and described in Patent No. 2,323,092 hereinabove referred to, and since the present invention is not concerned with the construction and operation of the scraping head, a detailed description of the scraping head is not necessary for a full understanding of the present invention.

Figure 3:
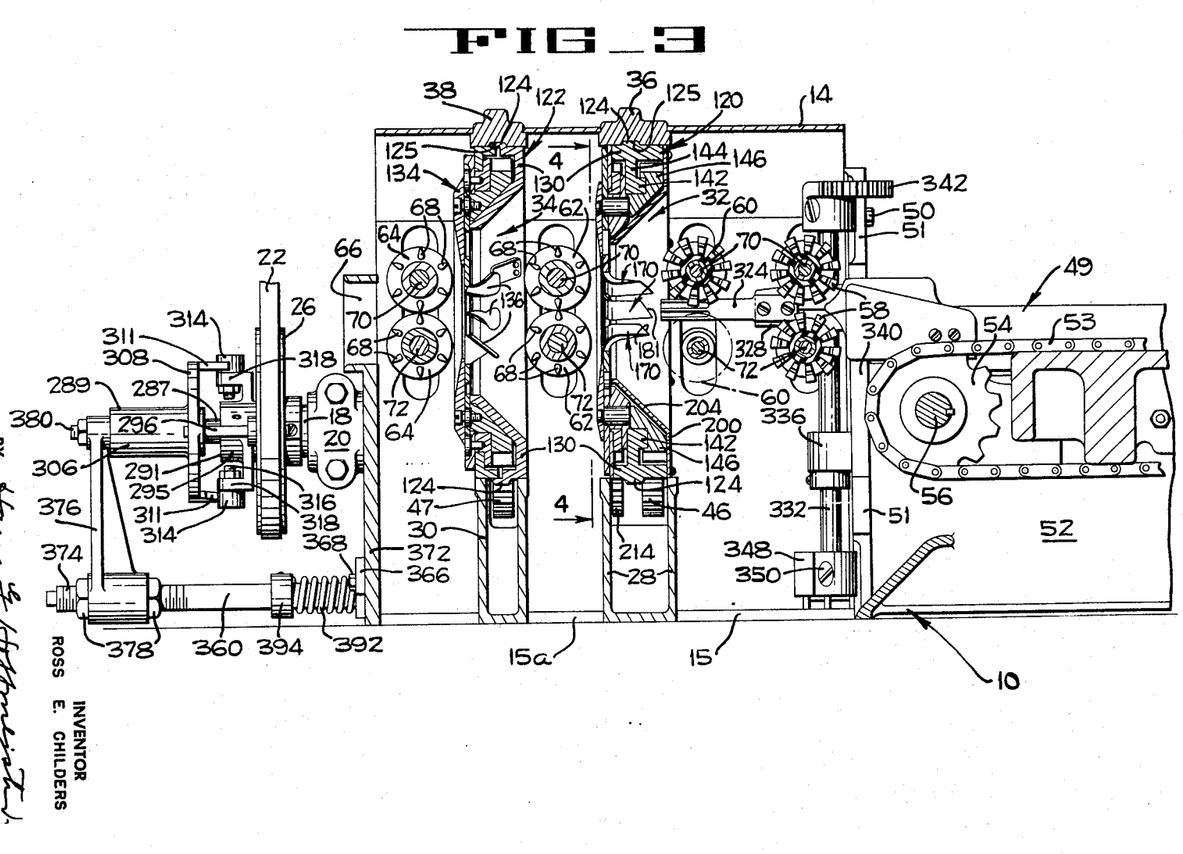
FIGURE 3 is an enlarged longitudinal section of the machine taken along lines 3—3 of FIG. 1.
Figure 4:
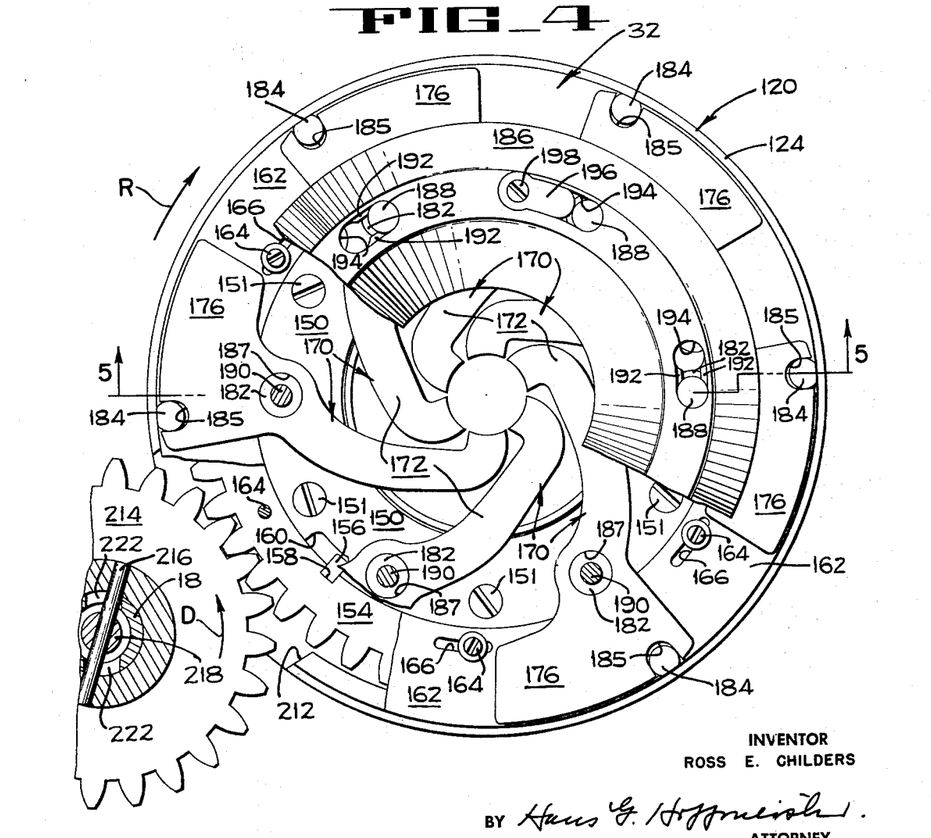
FIGURE 4 is an enlarged elevation of the cutting head and the driving means therefor viewed from the discharge side of the machine looking in the direction indicated by arrows 4—4 of FIG. 3, certain parts of said elevation being broken away.
Figure 5:
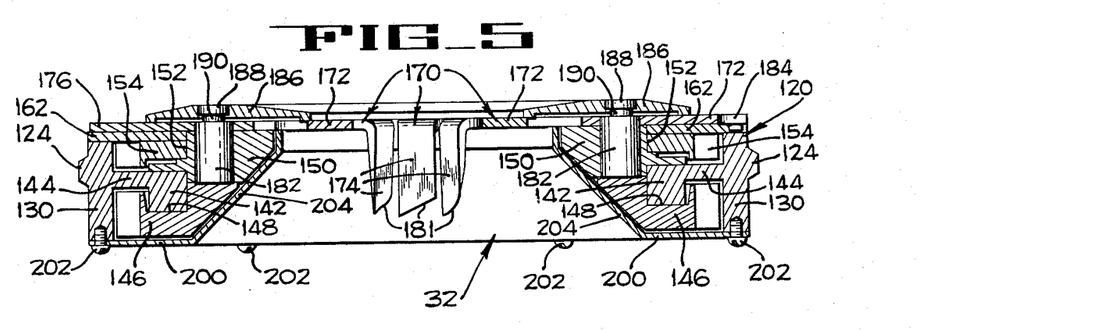
FIGURE 5 is a section of the cutting head taken along lines 5—5 of FIG. 4.

Referring now to FIGS. 3, 4 and 5, the bearing member 120 of the cutter head 32 is provided with an internal annular flange 142 concentric with the rim 130 of the bearing member 120 and spaced radially inward thereof by a web 144. The flange 142 provides a circular guide track for a driven knife support gear 146 that is freely rotatable within the bearing member 120. This gear 146 is provided in one lateral face thereof with an annular groove 148 within which one side of the flange 142 is disposed with a running fit. An annular plate 150 affixed to the gear 146 by screws 151 (FIG. 4) slidably engages the opposite side of the flange 142, with the result that the flange 142 is slidably embraced between the gear 146 and the plate 150, which are rotatable in unison within the bearing member 120.

The plate 150 is formed with an annular recess 152 to accommodate a knife adjusting gear 154 of the same pitch diameter as the gear 146. Since the gear 154 is fitted to the plate 150 with a running fit, the adjusting gear 154 is free to rotate with respect to the gear 146, but the extent of such relative rotation is limited by a key 156 (FIG. 4) seated tightly within a keyway 158 in the adjusting gear 154 and extending loosely into a circumferentially elongated recess 160 in the plate 150. A knife adjusting ring 162 is secured to the adjusting gear 154 by screws 164 (FIG. 4), each of which extends through a clearance hole 166 in the ring 162 into threaded engagement with the rim of the gear 154. Each of the clearance holes 166 is elongated in an arc concentric with respect to the ring 162 and gear 154 so that by loosening all the screws 164, the adjusting ring 162 is rotationally adjustable on the gear 154 through an angular distance limited by the length of the holes 166.

A plurality of knives 170 are disposed in engagement with radial faces of the annular plate 150 and the adjusting ring 162. The knives 170 are arranged in a circular pattern and are equally angularly spaced about the axis of rotation of the head 32. Each knife 170 comprises a shank 172, a blade 174 (FIG. 5) including a cutting edge 181 at the inner end of the blade, and a counterweight 176 (FIG. 4) at the outer end of the shank. Each knife 170 is pivoted adjacent the outer end of its shank 172 on a stud pin 182 rigid with the annular plate 150, and the counterweight 176 extends laterally from the side of the shank 172. Therefore, when the head 32 is rotated, centrifugal force exerted on the several counterweights 176 urges the knives 170 to rotate about their stud pins in a direction to cause the blades to move radially inward toward the axis of rotation, iris fashion. The knives 170 are adapted to be positively rotated in the opposite direction, against the action of centrifugal force exerted on the counterweights, by adjusting pins 184 which are rigid with the adjusting ring 162 and freely disposed in notches 185 in the outer ends of the shanks 172 of the knives 170. Thus, when the adjusting gear 154 and the ring 162 are turned clockwise (FIG. 4) with respect to the gear 146 and the annular plate 150, the knives 170 are simultaneously and coextensively swung radially outward to an expanded position.

When assembling the cutter head, the knives 170 should be set in their positions of minimum knife opening. This is accomplished after the knives have been placed in position upon the adjusting ring 162 and annular plate 150, with the stud pins 182 extending through the holes 187 provided for the purpose in the shanks 172 of the knives, and with the adjusting pins 184 engaged within the notches 185. Shifting the adjusting ring 162 on the gear 154 while the screws 164 are loose, effects adjustment of the knives 170 to their optimum setting, after which the screws 164 should be securely tightened, to preserve the adjustment.

The adjusting gear 154, the ring 162 and the several knives 170 are retained in their respective positions relative to the plate 150 and the gear 146 by a retaining ring 186 secured to the stud pins 182. Each stud pin 182 is formed with a head 188 at its outer end, connected to the body of the stud pin by a shank 190 of lesser diameter (FIG. 5). The heads 188 bear against depressed shoulders 192 extending inward from the lateral edges of arcuate slots 194 formed in the retaining ring 186. The shoulders 192 are shorter than the slots 194, and by rotating the retaining ring 186 clockwise (FIG. 4) with respect to the other portions of the head 32, the shoulders 192 may be withdrawn from under the heads 188, thus permitting removal of the ring 186. A spring clip 196 removably secured within one of the arcuate slots 194 by a screw 198, in position abutting against the head 188 of the associated stud pin 182, prevents accidental shifting of retaining ring 186 from the position in which it is securely locked upon the stud pins 182.

From the foregoing it is apparent that the gear 146, annular plate 150, stud pins 182 and retaining ring 186 are rotatable as a unit within the bearing member 120, carrying with them the knives 170 which are rotationally adjustable about their supporting stud pins 182 in response to shifting of the adjusting ring 162. Since the adjusting ring 162 is secured to the adjusting gear 154, the knives will remain in a given setting so long as the two gears 146 and 154 rotate together, but when the adjusting gear 154 is shifted clockwise (FIG. 4) with respect to the gear 146 (and consequently with respect to the stud pins 182) the knives 170 are adjusted to a more widely opened position.

The cutter head 32 is completed by a shielding plate 200 (FIGS. 3 and 5) secured by screws 202 to the annular forward edge of the rim 130 of the bearing member 120. The plate 200 has a frusto-conical central portion 204 providing a tapered entrance throat to the cutter head 32, and shielding the internal mechanism of the same from kernals and juices of corn during operation of the machine.

Two similar openings 210 (FIG. 1) and 212 (FIG. 4) are provided in the annular bearing member 120 in corresponding positions in the circumference thereof. The gear 46 which, as hereinbefore mentioned, is secured to the tubular auxiliary drive shaft 18, extends through the opening 210 (FIG. 1) into meshing engagement with the driven gear 146 of the cutter head 32, to effect rotation of the gear 146 upon rotation of the shaft 18. In this manner the moving parts of the cutter head 32 are rotated clockwise (FIG. 4) within the bearing member 120 to draw or whirl the knives 170 around an ear of corn as the same is advanced through the cutter head by the feed rollers 60 and 62.

A gear 214 (FIGS. 2, 3, 4, 6 and 7) whose diameter is the same as that of the cutter head rotating gear 46, extends through the opening 212 of the annular bearing member 120, into meshing engagement with the knife adjusting gear 154 within the cutter head 32. During operation, the gear 214 is rotated with the cutter head rotating gear 46. During adjustment, the gear 214 can be turned independently of the gear 46, as will now be described. The gear 214 is mounted on the tubular shaft 18 for free rotary motion with respect thereto, and is rigidly secured by a pin 216 (FIGS. 2, 4 and 7) to a shaft 218 that is rotatably supported within the bore of the tubular shaft 18 by bushings 220 (FIG. 2). The pin 216, while rigid with both the gear 214 and the inner shaft 218, extends through suitable clearance holes 222 in the tubular shaft, which permit rotational adjustment of the inner shaft 218 and the gear 214 with respect to the tubular shaft 18. The gears 46, 214 are members which cooperate to form a knife operating assembly, in that they rotate together for rotating the knives, but the members 46, 214 rotate relatively for adjusting the knives.

The above reference Patent No. 2,787,273 includes a torsion spring interconnecting the shafts 18 and 218 that is operative to urge the shaft 218 and the gear 214 to rotate clockwise (FIG. 4) relative to the shaft 18 and the gear 46. By virtue of the meshing engagement of the gear 214 and the knife adjusting gear 154, the torque of the spring urges the knives 170 counterclockwise about the associated pins 182, as viewed in FIGURE 4. Also urging the knives 170 in the same direction is the centrifugal force exerted by the counterweights 176. Thus, the force of the spring and the counterweight 176 cooperate to urge the knife to a minimum spacing position. However, it was found advantageous to provide a structure, operable while the machine was operating, to increase or decrease the force with which the gear 214, and ultimately the knives 170, were urged to their position of minimum spacing in order to resist the spreading action imposed on the knives during cutting of the corn. The torsion spring of the above patent is not operable to vary the force with which the knives are urged to their position of minimum spacing.

Figure 6:
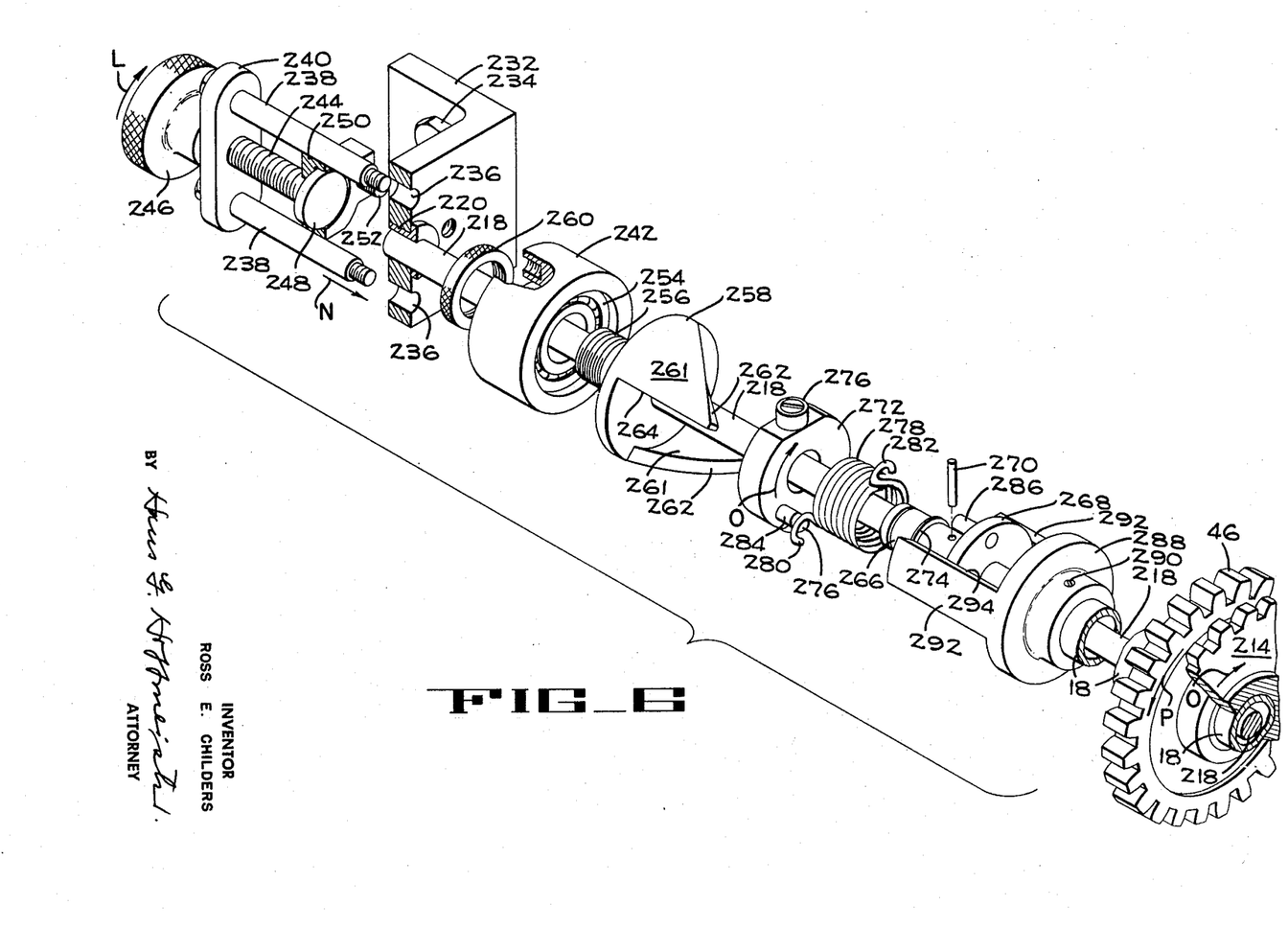
FIGURE 6 is an enlarged exploded perspective of the mechanism for urging the knives of the cutting machine to their adjusted position.

Referring now to FIGURES 2, 6 and 7 there is shown the adjuster mechanism for increasing or decreasing the torsion on a spring 278 (which corresponds in general to the knife-adjusting spring in the cutter of the above-mentioned patent) and thereby respectively increase or decrease the closing force on the knives 170. As will be seen, one end of the torsion spring 278 is connected to the knife (cutter head) rotating gear 46, and the other end is connected to the gear 214 which operates the knife adjusting gear 154 (FIG. 4), through an adjuster. The adjuster is operable while the knife gears 46, 214 are rotating the mechanism now to be described. An angle bracket 232 is bolted to the frame 52 by bolts 234 and includes two bores 236 through which adjusting rods 238 are slidably disposed. One end of each rod is secured to a plate 240 and the other end to a bearing housing 242. An adjusting screw 244 is threaded through the plate 240 and is provided with a knurled knob 246 which is adapted to be grasped by hand to effect turning of the screw 244 in the plate 240. The other end of the screw 244 has a radially enlarged portion 248 that is rotatable in a clamp 250 which is bolted to the bracket 232 by bolts 252 (only one of which is shown). In this manner the screw 244 is restrained against axial movement relative to the bracket 232 to thereby cause slidable movement of the plate 240 and the rods 238 when the screw is rotated.

The bearing housing 242 transmits adjustment settings to the torsion spring adjuster, as will now be described. The housing 242 has the outer race of a bearing 254 captively secured therein, and a threaded tubular extension 256 of a barrel adjuster cam 258 is secured to the inner race of the bearing by a nut 260, thus rotatably connecting the cam 258 to the bearing housing 242. The cam 258 is freely mounted on the shaft 218 and includes diametrically opposed axially extending generally triangular lugs 261 defined by helical cam surfaces 262 and axially extending rectilinear surfaces 264 (only one of which is shown). The adjuster cam follower is mounted on a short tubular shaft 266, having a radially extending flange 268, is pinned to the shaft 218 (and hence is coupled to the knife adjusting gear 214) by a pin 270. A circular cam follower adjuster plate 272 is rotatably mounted on the shaft 266 between spaced retainer rings 274. Cam follower rollers 276 are rotatably mounted on diametrically opposed peripheral portions of the plate 272 and are in rolling engagement with the cam surfaces 262. The cam follower plate 272 is interconnected to the flange 268 and the knife adjusting gear 214 by the torsion spring 278 which has loops 280 and 282 formed on the ends thereof, with the loops receiving pins 284 and 286 respectively mounted on the plate 272 and on the flange 268 respectively.

The left hand end of the tubular shaft 18, as viewed in FIGURES 2 and 6, has a hub 288 rigidly secured thereto by a set screw 290. Axially extending diametrically opposed lugs 292 form part of the hub 288 and have marginal edges 294 (only one is shown) in abutting sliding engagement with the surfaces 264 of the cam 258. The lugs 292 are thus functionally connected to the knife rotating gear 46, and provide a reaction surface for the torsion spring 276, as will be hereinafter explained. To summarize the spring mounting structure, the spring 278 is connected at one end to a knife operating member (adjusting gear 214) by means of the pin 286, flange 268, shaft 218, etc. The spring is connected at its other end to the other knife operating member (rotating gear 46) through an adjuster assembly 261, 272, etc., and the lugs 292 on the gear 46.

The above described structure increases or decreases the torsion on the spring 278 to thereby impart an increasing or decreasing force urging the knives 170 in the direction of minimum opening in the following manner. Assuming the adjusting screw 244 is turned in the direction of the arrow L, the rods 238 are moved in the direction of the arrow N. The bearing housing 242 and the adjuster cam 258 are also moved, on the shaft 218, in the same direction imparting a clockwise direction of rotation to the plate 272 (FIG. 6) by virtue of the cooperation of the cam surfaces 262 and the rollers 276. The consequent rotation of the pin 284, in the direction of the arrow O, relative to the pin 286, causes winding up of the torsion spring 278 thus imposing a torsional force on the tubular shaft 266 which, through the pin connection 270 transfers the torsional force to the shaft 218, to the pin 216, and to the gear 214 also in the direction of the arrow O. Since equilibrium conditions are maintained, the reaction to the torsional force of the spring is provided by the interengagement of the lugs 292 which have their side edges 294 in abutting, sliding engagement with the surfaces 264 of the cam 258. Due to the rigid connection of the hub 288 and the gear 46 to the shaft 18, the gear will receive a reaction force urging, but not rotating, the gear 46 in the direction of the arrow P, which is opposite and equal in magnitude to the torsion imposed on the gear 214.

An extension 287 (FIG. 2) of the shaft 218 provides support for a bracket 289 in a position spaced from the pulley 26 which is mounted on the adjacent end of the tubular shaft 18. A second bracket 291 is rigidly secured to the shaft extension 287 between the bracket 289 and the pulley 26, as by a setscrew 293 (FIG. 7) extending through the hub 295 of the bracket 291 and into engagement with a key (not shown) interconnecting the hub 295 and the shaft extension 287 in the conventional manner.

The bracket 289 is freely slidable and rotatable on the shaft extension 287, but is connected to the pulley 26 for rotation therewith by a sliding connection which permits axial movement of the bracket 289 toward and away from the pulley 26. This sliding connection comprises two pins 296 each of which extends through an opening 298 (FIGS. 7 and 8) in the web 300 of the pulley 26 to receive a nut 302 which, when tightened, draws a shoulder 304 of the pin tightly against the web 300 to secure the pin rigidly to the pulley 26. When so mounted, the pins 296 extend laterally from the pulley parallel to the axis of rotation thereof. The two openings 298 are formed in the web 300 in diametrically opposed relation, and each is elongated in the form of an arc concentric about the axis of rotation, to permit adjustment of the associated pin 296 in a circumferential direction. The bracket 289 includes a hub 306 and a radially extending disk 308, and each of the pins 296 extends through a hole 310 (FIG. 8) in the disk 308, the parts being so interfitted that the disc 308, and consequently the bracket 289, are free to slide back and forth on the shaft extension 287 and on the pins 296 while being rotated by the pulley 26.

The bracket 289 is provided with two diametrically opposed ears 311 extending from the disk 308 toward the pulley 26. Adjacent its distal end, each of the ears 311 is provided with an inclined camming surface 312, which is operably engaged by a cam roller 314, rotatably mounted on a supporting pin 316, rigidly and threadedly engaged with an arm 318 of the bracket 391 which, as already mentioned, is secured to the shaft extension 287. The direction of inclination of each of the camming surfaces 312 is such that it interconnects the distal end 320 of the associated ear 311 and the edge 322 of the ear that leads during rotation of the mechanism. Therefore, the engagement between the camming surfaces 312 and the came rollers 314 is such that the bracket 291 and the shaft 218 to which the bracket 291 is secured are driven by the bracket 289, and consequently at the same speed as the tubular auxiliary drive shaft 18 so long as the bracket 289 remains at fixed distance from the pulley 26 (see FIG. 8). However, when the bracket 289 is slid toward the pulley 26, the inclined surfaces 312 cam the rollers 314 forward and thereby cause the shaft 218 to rotate more rapidly than the tubular shaft 18 so long as such motion of the bracket 289 toward the pulley 26 continues. Thus it may be seen that by sliding the bracket 289 toward the pulley 26, the inner shaft 218 and with it the knife adjusting gear 214 can be advanced with respect to the tubular shaft 18 and the head rotating gear 46 to attain outward, or expansion adjustment of the knives 170, as hereinabove explained.

Gauging means are provided for effecting such knife-opening movement of the bracket 289 in proportion to the diameter of an ear of corn approaching the cutter head 32. For this purpose a pair of opposed gauging fingers 324 (FIGS. 3 and 7) are arranged in horizontal alignment at opposite sides of the axis of rotation of the heads 32 and 34. The gauging fingers 324 operate between and in adjacency to the second pair of feed rollers 60, the ends of which are annularly relieved to provide operating space for the fingers 324. This relative positioning of the feed rollers 60 and the gauging fingers 324 permits both the rollers and the fingers to be mounted immediately adjacent the zone of operation of the cutting edges 181 of the corn cutting knives 170 (FIG. 3), thus reducing to a minimum the distance that any portion of an ear of corn must travel after the diameter of that portion of the ear has been measured by the gauging fingers 324 and before encountering the cutting edges 181.

When the corn cutting machine is being used to process corn of the type characterized by kernels disposed in straight rows, the gauging fingers 324 employed are provided on their opposed corn engaging faces with horizontal, longitudinally extending ridges 326. These ridges are adapted to extend into spaces between, and to make sliding engagement with rows of kernels of an ear of corn advancing through the cutter head 32. In this manner the gauging fingers 324 engage the ear of corn in a manner resembling a splined connection, thus cooperating with the rollers 60 in resisting any tendency for the ear of corn to be rotated about its longitudinal axis while being operated upon by the rotating knives 170.

Each of the gauging fingers 324 is carried by a supporting bracket 328, and since the fingers 324 are attached to their brackets 328 by machine screws 330 (FIG. 7), the gauging fingers 324 are readily removable to permit the substitution therefor, of gauging fingers whose corn-contacting faces are smooth in the event that corn of a type wherein the kernels are not disposed in straight rows, is to be processed.

Each of the gauging finger supporting brackets 328 is carried by a vertical shaft 332, and 334 (FIGS. 3 and 7) journalled in bosses 336 and 338, respectively, formed on the transverse web 51 of the feed trough frame 52. The shafts 332 and 334 are arranged at opposite sides of an opening 340 in the web 51 through which the ears of corn pass when leaving the feed trough 49 and entering between the first pair of feed rollers 58. The shafts 332 and 334 are interconnected by equalizing sector gears 342 rigid therewith. The teeth 344 of these sector gears are enmeshed with each other, thereby insuring coextensive rotation of the shafts 332 and 334 in opposite directions about their respective axes.

A shifting dog 346 extends radially from the shaft 332, to which it is rigidly secured by a block 348. A threaded pin 350 secures the block 348 rigidly to the shaft 332. The shifting dog 346 extends into an annular groove 352 (FIGS. 2 and 7) between spaced flanges 354 carried by a sleeve 356 that is rigidly secured upon a reduced portion 358 of a push rod 360. A nut 362 and washer 364 rigidly secure the sleeve 356 in position on the push rod 360.

The push rod 360 is mounted in spaced, parallel relation to the shafts 18 and 218, and the end of the rod 360 carrying the sleeve 356 extends slidably through the transverse web 51 of the feed trough frame 52. Intermediate its ends, the push rod 360 extends slidably through a bracket 366 which is secured by a bolt 368 and nut 370 to a web 372 of the housing 14; and beyond the bracket 366, the threaded end 374 of the push rod 360 carries a radially extending arm 376 securely clamped in position by lock nuts 378.

A bolt 380 (FIG. 2) secures the inner race 382 of an anti-friction thrust bearing 384 to the outer end of the arm 376. The outer race 386 of the bearing 384 is seated within an annular groove 390 in the bore of the hub 306 of the bracket 289. Consequently, the anti-friction bearing 384 assists in rotatably supporting the bracket 289 and operates to slide the same axially on the shaft extension 287 in response to axial movement of the push rod 360.

A coil spring 392 encircling the push rod 360 and under compression between the bracket 366 and a collar 394 rigid with the push rod 360, continually urges the push rod 360 to the right as viewed in FIG. 2, and to the left as viewed in FIG. 7. Motion of the push rod 360 in the opposite direction, i.e., the direction in which the push rod 360 is moved when the gauging fingers 324 swing away from each other, is limited by the washer 364 which is of greater diameter than the hole in the web 51 through which the sleeve 356 extends.

OPERATION

Prior to starting the machine the cam 258 is moved toward the hub 288 causing the torsion spring 278 to be wound up and thus preload the shaft 218 to urge the knives 170 to a minimum opening position. The preload is also operative to maintain the surfaces 264 and 294 in abutting contact during acceleration of the shafts 18 and 218 to their steady state operating speed. In this manner no relative rotation of the shafts 18 and 218, and the gears 46 and 214 respectively, takes places upon starting.

Now assuming the machine to be in operation and the main drive shaft 16 to be rotating in a clockwise direction as viewed in FIG. 1, the auxiliary drive shaft 18 is rotated in the same direction by the belt 22 and pulleys 24 and 26, thus causing the drive gears 46 and 47 to rotate counterclockwise as viewed in FIG. 7. The gears 46 and 47 drive the cutter head 32 and scraper head 34, respectively, at comparatively high speed, for example, 1200 r.p.m.

All eight roller shafts 70 and 72 are driven by the main drive shaft 16, and thus effect rotation of the feed rollers 58, 60, 62 and 64. Ears of corn to be cut are placed by an operator in the trough 49, in which the ears are continuously fed axially toward the rapidly rotating cutter head 32 by the feed chain 53. Each ear of corn passes between cooperating rollers 58 which advance the ear to the rollers 60. These engage the ear and feed it axially into the cutter head 32 along the axis of rotation thereof.

As an ear of corn passes between the rollers 60, it likewise passes between the gauging fingers 324 spreading them apart and causing their respective shafts 332 and 334 to turn. As hereinabove explained, rotation of the shafts 332 and 334 in opposite directions is equalized by the sector gears 342, thus assuring that the ear of corn will not move horizontally out of axial alignment with the rotating cutter head 32; and since the upper and lower rollers of each pair 58, 60, 62 and 64 are likewise interconnected by equalizing arms 84 and 86 and the tooth and notch arrangement 104, each ear of corn will be prevented from moving vertically out of axial alignment with the cutter head.

As the shaft 332 turns in response to entry of an ear of corn between the gauging fingers 324, the shifting dog 346 is actuated to draw the push rod 360 to the right as viewed in FIG. 7, against the urgency of the coil spring 392. The extent of such motion is proportional to the diameter of the ear of corn passing between the gauging fingers 324.

Motion of the push rod 360 is transmitted to the bracket 289 by the radially extending arm 376, thus advancing the rotating bracket 289 and its ears 311 to the right as viewed in FIG. 7. This causes the inclined camming surfaces 312 to rotate the driven bracket 291 at a slightly increased speed, causing the inner shaft 218 to advance slightly with respect to the tubular drive shaft 18. In this manner, the knife adjusting gear 214, which is rigidly secured to the inner shaft 218, is advanced slightly with respect to the cutter head driving gear 46, with the result that the knife adjusting gear 154 within the cutter head 32 is likewise advanced slightly with respect to the driven gear 146.

Since the adjusting ring 162 is rigid with the gear 154, while the annular plate 150 is rigid with the gear 146, such advance of the gear 154 with respect to the gear 146 causes the adjusting pins 184 to advance clockwise (FIG. 4) with respect to the stud pins 182, thus simultaneously pivoting all the knives clockwise (FIG. 4) about their respective stud pins 182, so that their inner blade carrying ends swing radially outward, iris fashion.

Thus it may be seen that as a consequence of the gauging fingers being spread apart by an ear of corn entering between them, the cutting edges 181 of the knives are disposed in a circle of larger diameter. The parts are so proportioned that the extent of the adjustment of the knives 170 so attained is proportional to the diameter of the ear of corn, so that regardless of the size of any ear fed into the machine, the whirling knives 170 are automatically adjusted by the ear itself, to the optimum position to cut the kernels therefrom.

The gauging fingers 324 impart to the gauging mechanism a higher degree of sensitivity than can be attained by the use of gauging rollers, which, being round, engage the ear of corn in a region which unavoidably is spaced from the knives by a distance at least as great as the radius of the rollers. The ends of the gauging fingers 324, being flat, make gauging engagement with the corn at a region significantly closer to the zone of operation of the knives, as can readily be appreciated by comparing the position of the distal ends of the gauging fingers 324 in FIG. 3, with the portion of the curcumference of either of the rollers 60 which makes contact with an ear of corn gripped between the two rollers 60. Therefore, the flat-ended gauging fingers 324 are conducive to maximum accuracy in regard to depth of cutting, particularly when a short, relatively sharply tapered portion of an ear of corn is being cut.

When ears of corn are to be processed to produce whole kernel corn, the knives 170 should be set to cut the kernels from the ears only slightly above the cob line. On the other hand, if cream style corn is to be prepared the knives 170 should be set to cut through the kernels at a greater distance from the cob line. In either case, the appropriate adjustment of the knives 170 may be attained by shifting the adjusting ring 162 on the gear 154 as hereinabove explained, by shifting the pins 296 within the arcuate slots 298, and/or by shifting the radial arm 376 axially on the rod 360 by suitable manipulation of the nuts 378.

While the ear of corn is being cut by the knives 170 the resistance offered by the kernels tend to urge the knives outwardly against the centrifugal force derived from the weighted portions 176 and the force from the spring 278 resulting in a line of cut that is not an equal distance above the cob line throughout the length of the ear. Therefore an increase in the force urging the knives to the position determined by the gauging fingers is necessary.

As previously mentioned, such an increase in force is accomplished by rotating the knob 246, which is secured to the screw 244, in the direction of the arrow L (FIG. 6). Since the screw 244 is restrained against longitudinal or axial movement by the enlarged portion 248 being secured in the clamp 250, the plate 240 and the rods 238 are caused to move in the direction of the arrow N. This in turn causes the bearing housing 242 and the cam 258 to move in the same direction. By virtue of the rolling engagement of the cam rollers 276 on the cam surfaces 262, rotational movement in the direction of the arrow O is imparted to the plate 272 causing the spring 278 to be wound up. Reaction to the torsion of the spring 278 is provided by the triangular lugs 261, the lugs 292, the set screw 290, the shaft 18, and the gear 46 which are all immovably urged in the direction of the arrow P. As viewed in FIG. 4, the adjusting gear 154 is forced in a clockwise direction thus tending to rotate the knives 170 about their respective pins 182 in a counterclockwise direction to a minimum opening position. If any tendency of the knives to spread is evident, increases in the force urging the knives 170 to their minimum opening position is effected by additional movement of the cam 258 in the direction of the arrow N.

After passing through the cutter head 32, each cob is passed on by the feed rollers 62 to and through the scraping head 34, which removes portions of the kernels remaining on the cob after passage through the cutter head, as explained in Patent No. 2,323,092, hereinbefore mentioned. As each cob emerges from the scraping head 34, it is gripped by the last pair of rollers 64, which advance the cob through the discharge outlet whence the cob drops into any suitable means (now shown) for disposing of the cobs.

The kernels or parts of kernels, as the case might be, which are severed from the cobs by the knives 170, are guided by the conical shielding plate 204 and the partition 28 as they gravitate downward, to the discharge opening 15 (FIG. 3) through which they drop into a suitable conveyor (not shown) to be transported for further processing. The scrapings, i.e., kernel parts and corn milk, removed from the cobs during their passage through the scraping head 34, drop through the discharge opening 15a onto another conveyor (not shown) which conducts them to any desired point of discharge.

At all times during operation of the machine, centrifugal force acts on the counterweights 176, urging them to rotate their respectively associated knives 170 as nearly into their position of minimum opening as they are permitted to move by the gauging mechanism. Consequently, any lost motion that might otherwise be present in the driving connections between the knives 170 and the knife adjusting gear 214 is effectively taken up, making the knives 170 instantly and completely responsive to any rotational shifting of the inner shaft 218 within the tubular shaft 18.

The torsion spring 278 likewise functions to increase the sensitivity and responsiveness of the knife adjusting mechanism, by holding the follower rollers 314 against the camming surfaces 312. However, the maintenance of contact between the rollers 276 and the camming surfaces 262 is equally important when the machine is idle and the cutter head 32 is removed from the machine, because it assures retention of the knife adjusting gear 214 in proper position to be re-engaged by the gear 154 when the head 32 is replaced in the machine, and thus aids in assuring re-assembly with the knives 170 and the gauging fingers 324 in their proper relative positions.

Another function of the torsion spring 278 is to relieve pressure of the teeth of the gear 154 against the teeth of the gear 214, and thus avoid resistance to return of the knives 170 to their closed position by centrifugal force acting on the counterweights promptly as each ear of corn completes its passage through the cutter head 32.

While a preferred apparatus for carrying out the invention has been shown and described, it will be understood that it is capable of modification and variation while still employing the principles of the invention. It is to be understood, therefore, that the scope of the invention should be limited only by the scope and proper interpretation of the claims appended hereto.

I claim:

1. A produce cutting apparatus having the cutting portions of a plurality of knives positioned to define a generally circular passageway through which produce is fed to effect cutting of outer peripheral portions therefrom, said apparatus comprising a rotatable support means mounting the knives for rotation about the axis of the circular passageway and having each of the knives pivotally mounted thereon, means for simultaneously pivoting the knives toward and away from such axis to effect reduction or enlargement of the circular passageway respectively, means for urging the knives toward such axis, and a cam and follower operably connected to said urging means and operable during rotation of said support means for increasing or decreasing the force with which the knives are urged toward such axis.

2. For use in a produce machine of the type having radially adjustable, rotary cutting knives, a knife rotation gear, and a knife adjusting gear, a knife adjusting assembly comprising a tubular shaft having a knife rotation gear secured thereto, a shaft rotatably mounted within said tubular shaft and having the knife adjusting gear secured thereto, means responsive to the diameter of produce for rotating said second mentioned shaft to cause a corresponding radial outward movement of the knives, and means interconnecting said shafts for increasing or decreasing the force with which the knives are urged radially inwardly while said knives are being rotated.

3. For use in a produce cutting machine of the type having radially adjustable, rotary cutting knives, a knife rotation gear, and a knife adjusting gear, a knife adjusting assembly comprising a tubular shaft having the knife rotation gear secured thereto, a shaft rotatably mounted within said tubular shaft and having the knife adjusting gear secured thereto, means responsive to the diameter of produce for rotating said second mentioned shaft to cause a corresponding radial outward movement of the knives to an adjusted position, a torsion spring having one end connected to rotatably urge said tubular shaft in one direction and the other end connected to rotatably urge said second mentioned shaft in the opposite direction, and cam means including a follower secured to said second mentioned shaft for selectively increasing or decreasing the force which urges said shafts in the mentioned directions and thereby vary the force with which the knives are maintained in the adjusted position.

4. For use in a cutting machine of the type having radially adjustable, rotary cutting knives, a knife rotation gear, and a knife adjusting gear, a knife adjusting assembly comprising a tubular shaft having the knife rotation gear secured thereto, a shaft rotatably mounted within said tubular shaft and having the knife adjusting gear secured thereto, a barrel cam mounted for rotatable and axial movement on said second mentioned shaft, means for moving said cam in opposite axial directions relative to said second mentioned shaft, a torsion spring, means responsive to the axial movement of said cam for winding or unwinding said torsion spring, and means for transmitting the torsional force of said spring to said adjusting gear and thereby biasing the knives radially inwardly.

5. An apparatus for selectively increasing or decreasing the force with which cutting knives of a machine of the type having a knife rotating drive train secured to an input shaft and a knife adjusting drive train secured to an input shaft are maintained in their adjusted position, the improvement comprising a cylindrical cam mounted for axial movement on the input shaft of the knife adjusting drive train, cam shifting means engaged with said cam for selectively axially moving said cam in opposite directions, a cam follower associated with said cam and rotatable relative to the input shaft of the knife adjusting drive train during axial movement of said cam, and a torsion spring having one end fixed relative to the input shaft of the knife adjusting drive train and the input shaft of the knife rotating drive train and the other end secured to said cam follower so that winding or unwinding of said spring is effected when said cam shifting means moves said cam toward and away respectively relative to said cam follower, wherein winding or unwinding of said spring increases or decreases respectively the force with which the cutting knives are urged to maintain their adjusted position.

6. In a cutting machine of the type having circumferentially adjacent knives that define a circular passageway through which produce is fed during removal of peripheral portions therefrom, said apparatus comprising a first and second coaxial ring gears, pinion gears in meshing engagement with said first and second gears, a tubular shaft having one of said pinion gears secured thereto and a shaft rotatably mounted within said tubular shaft having the other pinion gear secured thereto, means for pivotally mounting each knife to said second ring gear for permitting simultaneous movement of the knives toward and away from the axis of the circular passageway, gauging means for rotating said pinion that is in meshing engagement with said second ring gear to effect simultaneous pivotal movement of the knives to an adjusted position away from the axis of the circular passageway, means for transmitting a force to the other of said pinion gears to urge the knives to the adjusted position, and cam means operably connected to said last mentioned means for increasing or decreasing such a force.

7. In a cutting machine of the type having circumferentially adjacent knives that define a circular passageway through which produce is fed during removal of the peripheral portions therefrom, said apparatus comprising a first and second coaxial ring gears, pinion gears in meshing engagement with said first and second gears, a tubular shaft having one of said pinion gears secured thereto and a shaft rotatably mounted within said tubular shaft having the other pinion gear secured thereto, means for pivotally mounting each knife to said second ring gear for permitting simultaneous movement of the knives toward and away from the axis of the circular passageway, gauging means for rotating said pinion that is in meshing engagement with said second ring gear to effect simultaneous pivotal movement of the knives to an adjusted position away from the axis of the circular passageway, a torsion spring for rotatably urging said shafts in opposite directions, and a cam and a follower operative to wind and unwind said torsion spring to increase or decrease the degree with which said shafts are urged in the opposite directions.

8. The combination of claim 5 further comprising a reaction member secured to the input shaft of said knife rotating drive train for maintaining said cam against rotation at least during axial movement thereof along the input shaft of said knife adjusting drive train.

9. A produce cutting apparatus having the cutting portions of a plurality of knives positioned to define a generally circular passageway through which produce is fed to effect cutting of the peripheral portions therefrom, said apparatus comprising a rotatable support means mounting the knives for rotation about the axis of the circular passageway and having each of the knives pivotally mounted thereon, driving means engaged with said support means for rotating said support means at a substantially constant speed, means acting through said driving means for simultaneously pivoting the knives toward and away from such axis to effect reduction or enlargement of the circular passageway respectively, means acting through said driving means for urging the knives toward such axis, said urging means including an adjusting means operable during rotation of said support means for varying the force with which the knives are urged toward such axis, said adjusting means including a torsion spring supplying said force, said spring having a cam follower connected thereto, and cam means operatively engaged with said cam follower for selectively rotating said cam follower in opposite directions to effect winding or unwinding of said torsion spring to thereby increase or decrease respectively said force.

10. A knife adjusting assembly for use in a produce cutting machine of the type having radially adjustable rotary produce cutting knives mounted in a rotatable mounting member, a first knife rotation gear mounted on said member, and a first knife adjusting gear mounted on said member, said assembly comprising: a first shaft having a second knife rotation gear secured thereto and in driving engagement with said first rotation gear, said first shaft being tubular; a second shaft rotatably mounted within said first shaft and having a second knife adjusting gear secured thereto and in driving engagement with said first adjusting gear; means responsive to produce and operatively connected to said tubular shaft for effecting rotation of said adjusting gears with respect to said rotation gears to cause a corresponding radial movement of said knives; means interconnecting said shafts for applying a continuous force to said rotation gears and said adjusting gears to urge said knives radially inward toward said axis; means for driving said second rotational gear and said second adjusting gear at the same velocity; and means operatively coupled to said interconnecting means for varying the magnitude of said force while said second rotational gear and said second adjusting gear are rotating at the same velocity.

11. In an apparatus for cutting produce which includes a core and an outer peripheral portion, said apparatus including a plurality of knives having cutting edges, means mounting said knives so that said edges define an opening for receiving said produce, and means for moving said knives between open and closed positions to change the size of said opening, the combination of a motion transmitting member, motion transmitting means rotatable relative to said member and coupled to the knife moving means, a torsion spring having opposite ends, first spring coupling means on said motion transmitting means engaging one end of said spring, and second spring coupling means on said motion transmitting member engaging the opposite end of said spring so that said spring applies a bias through said motion transmitting means to said knives to yieldably urge the knives toward one of their positions, one of said spring coupling means including means for adjusting the torsional force applied by said spring through said motion transmitting means to said knives.

12. A produce cutting apparatus having a plurality of knives with cutting portions positioned to define a generally circular passageway through which produce is fed to effect cutting of outer peripheral portions of the produce; said apparatus comprising a frame, knife support means rotatable in said frame and mounting the knives for rotation about the axis of the passageway and having each of the knives movably mounted thereon, rotatable knife adjustment means for simultaneously moving the knives toward and away from such axis to effect respective reduction or enlargement of the passageway; knife operating means comprising rotatable, relatively movable members for both simultaneously rotating said knife support and adjustment means and for causing relative, knife adjustment motion thereof; a spring device, spring device mounting means for respectively connecting each end portion of said spring device to one member of said knife operating means for resiliently urging relative motion of said knife operating means in a direction that reduces the produce passageway; and means for rotating said knife operating means; one of said spring device mounting means comprising an adjuster connecting one end portion of said spring device to the associated member, and means for positioning said adjuster while said knife operating means is rotating for increasing or decreasing the force with which said spring device urges the knives toward said axis.

13. The apparatus of claim 12, wherein said adjuster positioning means comprises a manually operable device mounted on said frame and a connection between said latter device and said adjuster for accommodating relative rotation of the adjuster and said manually operable device.

References Cited by the Examiner
UNITED STATES PATENTS

| | | | |
|---|---|---|---|
| 1,282,792 | 10/1918 | Fenn | 130—9.2 |
| 1,975,574 | 10/1934 | Hansen | 120—9.2 |
| 2,214,285 | 9/1940 | Schmidt | 130—9.2 |
| 2,323,092 | 6/1943 | Kerr | 130—9.2 |
| 2,577,530 | 12/1951 | Kerr | 130—9.2 |
| 2,787,273 | 4/1957 | Kerr | 130—9.2 |

ABRAHAM G. STONE, *Primary Examiner.*

ANTONIO F. GUIDA, *Examiner.*